No. 839,375. PATENTED DEC. 25, 1906.
W. L. R. EMMET.
POWER TRANSMISSION APPARATUS.
APPLICATION FILED APR. 4, 1906.
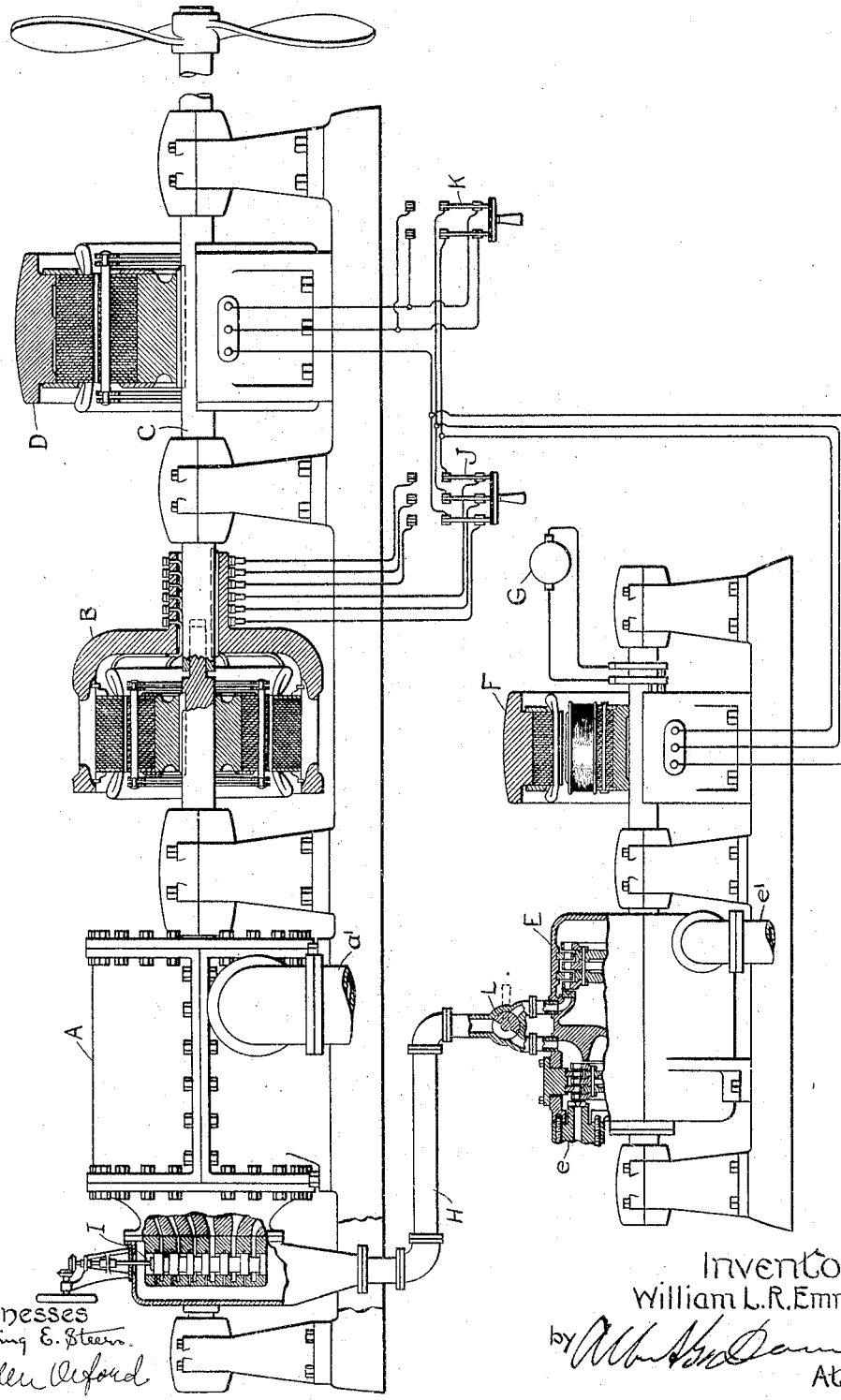
Witnesses
Irving E. Steen
Helen Oxford
Inventor
William L. R. Emmet.
by
Atty.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

POWER-TRANSMISSION APPARATUS.

No. 839,375.  Specification of Letters Patent.  Patented Dec. 25, 1906.

Application filed April 4, 1906. Serial No. 309,765.

*To all whom it may concern:*

Be it known that I, WILLIAM L. R. EMMET, a citizen of the United States, residing at Schenectady, county of Schenectady, State of New York, have invented certain new and useful Improvements in Power-Transmission Apparatus, of which the following is a specification.

My invention relates to the transmission of power from a prime mover to a driven member, and is particularly applicable to the transmission of power from marine turbines to the propeller-shaft, although my invention is not limited to this particular application.

It has been proposed heretofore to employ dynamo-electric machines for the purpose of transmitting power at different speeds from a prime mover to a driven shaft.

The object of my invention is to provide a novel arrangement of the dynamo-electric machines which will transmit the power efficiently at different speeds and which will allow the turbine to run at speeds much higher than the propeller and which renders it possible to employ electrical machines of a simple type adapted to stand without injury heavy overloads.

My invention consists in employing a generator of the induction type having one member driven by the prime mover and the other mounted on the driven shaft, an induction-motor supplied with the current generated by the difference in speed of the primary and secondary members of the generator, and a synchronous machine for fixing the frequency for the induction-machines. With such an arrangement the turbine may run at a much higher speed than the propeller-shaft, thereby securing maximum efficiency in the turbine. The machines are of the simplest possible type, involving the minimum number of sliding contacts and adapted to carry heavy overloads without injury, and since a portion of the power of the turbine is transmitted directly to the driven shaft through the torque between the primary and secondary members of the induction-generator the weight of the apparatus is less and its efficiency is higher than in an arrangement where all the power is transmitted electrically.

My invention further comprises varying the number of poles of one of the induction-machines so as to vary the speed of the driven shaft.

My invention further comprises means for cutting the induction-generator out of circuit and shutting the steam off from the turbine driving the generator, so that the synchronous machine alone may drive the propeller through the induction-motor. In this manner the propeller may be reversed simply by reversing the induction-motor. Consequently my invention allows backing without using any idle turbine while running forward.

My invention further comprises certain arrangements of the turbines and piping whereby high efficiency is obtained both in moving forward and in backing.

My invention will best be understood by reference to the accompanying drawing, which shows somewhat diagrammatically power-transmitting apparatus arranged in accordance with my invention.

A represents a steam-turbine carrying on its shaft the secondary member of an induction-generator B. This secondary may be of the simple squirrel-cage type. The primary member of the induction-generator is mounted on the propeller-shaft C, which also carries the secondary member of the induction-motor D.

E represents a second turbine, which drives the synchronous generator F, which is connected in circuit with the induction-machines and fixes their frequency. The synchronous generator may be self-excited or separately excited from any suitable source, (indicated diagrammatically by the direct-current generator G.)

H represents a pipe running from the exhaust of the turbine E to the turbine A, which is driven normally by the exhaust-steam of turbine E. Turbine E is a high-pressure high-speed machine, while turbine A can be operated efficiently at a much lower speed, an arrangement which materially assists in securing high efficiency for the system as a whole, since the speed of turbine A is to a certain extent limited by the propeller speed, as will hereinafter appear, while turbine E may run at any speed desired.

I represents a valve mechanism for controlling the admission of steam to the turbine A. By adjusting this valve the pressure of the steam delivered from turbine E to turbine A can be regulated, thereby regulating the division of load between the two turbines.

J represents a double-throw switch in circuit with the primary member of the induction-generator B, which is arranged for producing two different pole numbers. Many such arrangements of windings and connections for producing different pole numbers of induction-motors are at present well-known in the art, and it is consequently not deemed necessary to illustrate any specific arrangement of connections for this purpose.

K represents a double-throw switch adapted to reverse the direction of rotation of the induction-motor D.

L represents a three-way valve which is adapted to cut off the steam from turbine A and deliver it to a normally idle portion of the turbine E, so that the output of this machine may be increased when it is carrying the entire load in backing, as will be hereinafter explained. $e$ represents the admission-pipe for this turbine, and $e'$ an exhaust connection from the normally idle portions of the turbine to the condenser. (Not shown.)

$a'$ represents the exhaust connection from the turbine A.

The operation of the apparatus above described is as follows: Normally the valve L is in the position shown, so that the turbine E has one portion idle and delivers its exhaust-steam to the turbine A. The idle portion of the turbine E is preferably connected to the vacuum, so as to reduce friction losses to a minimum. The turbine A drives the secondary member of the generator B, thereby driving the primary member at a lower speed, determined by the number of poles and the frequency of the current. A portion of the power delivered by the turbine A to the shaft is transmitted directly to the shaft C through the torque between the primary and secondary member of the generator B. The rest of the power delivered by the turbine is transformed into electrical energy, which is delivered to the induction-motor D, which transforms it into mechanical power and delivers it to the propeller-shaft C. The synchronous generator F, which is connected in parallel with the induction-machines, fixes their frequency, furnishes the exciting-current for the induction-generator, and, further, delivers power to the induction-motor D, so as to assist in driving the load. The division of load between the turbines E and A may be adjusted, as heretofore mentioned, by adjusting the admission-valve mechanism I.

The operation will perhaps be best understood by assuming certain conditions and considering the operation of the several parts of the apparatus under these conditions.

In the following discussion the small amount of slip of the generator B and of the induction-motor D above and below synchronism, respectively, will be neglected. Assume, for instance, that a maximum speed of three hundred and fifty revolutions is required for the propeller-shaft, also assume that the generator B is connected for sixteen poles, the induction-motor D for sixteen poles, and the synchronous generator F for four poles. With this connection the generator B has the same number of poles as the induction-motor D, and consequently the relative speed of its primary and secondary members must be the same, neglecting slip, as the speed of the induction-motor. The speed of the induction-motor has been assumed to be three hundred and fifty revolutions. Consequently the turbine A must be operating at seven hundred revolutions. Since the synchronous generator has only four poles, turbine E will be operating at fourteen hundred revolutions. If the valve-admission mechanism I is adjusted so that turbine E is carrying one-third of the total load and if the output of this turbine is two thousand horse-power under the above conditions, the output of turbine A will be four thousand horse-power. Since the shaft C is running at half the speed of the turbine A, one-half of this output— $i.\ e.$, two thousand horse-power—is delivered mechanically directly to the shaft C through the torque between the two members of generator B. The other two thousand horse-power delivered by the turbine A is transformed by the generator B into electric energy and delivered to the motor E. The induction-motor E is also receiving two thousand horse-power from the synchronous generator F, and consequently is delivering four thousand horse-power to the propeller-shaft. The total power delivered to the propeller-shaft is thus six thousand horse-power, of which two thousand is delivered directly from turbine A and the other four thousand is delivered electrically half from each of generators B and F. Now let it be assumed that it is wished to lower the propeller speed to two hundred and fifty revolutions, and let it be assumed that the number of poles of generator B is changed from sixteen to eight by throwing the switch J to its other position. This generator now has half the number of poles of induction-motor D, and consequently the relative speed of its primary and secondary members must be twice the speed of the propeller-shaft. In other words, turbine A must run at seven hundred and fifty revolutions. The turbine E, driving the synchronous motor, will run at one thousand revolutions. Assuming that the load between the two turbines is so adjusted that turbine E is carrying one-fourth of the total load and that the power required for driving the propelling-shaft at this speed is two thousand one hundred and fifty horse-power, the generator E will deliver approximately five hundred and thirty-seven horse-power, which will be delivered by the generator F to the induction-motor D. The turbine A will deliver approximately sixteen hundred and twelve horse-power, of which approximately one-third—that is, five hundred and thirty-seven horse-power—will be delivered directly to the propeller-shaft, and the other two-thirds—that is, ten hundred and seventy-five horse-power—will be transformed into electric energy by the generator B and delivered to the motor D. The induction-motor consequently will deliver sixteen hundred and twelve horse-power to the propeller-shaft, receiving two-thirds of this power from the generator B and the other one-third from the generator F. This power delivered by the induction-motor, together with that delivered directly from turbine A to the shaft C, amounts to the two thousand one hundred and fifty horse-power required.

Obviously intermediate speeds may be obtained by increasing the speed and output of the turbines by regulating the admission of steam to turbine E in any suitable manner.

For backing the propeller, valve L is moved to cut the steam off from turbine A and to deliver it to the normally idle portion of turbine E, switch J is moved to off position, opening the circuit of generator B, and switch K is thrown to its other position, so as to reverse the motor D. Turbine A and generator B are thus rendered idle, while turbine E is working at its full capacity, driving the generator F, which delivers all the output of turbine E to the induction-motor D, which having been reversed drives the propeller in the opposite direction.

The induction-machines described above may be of exceedingly simple construction, with secondary members of the squirrel-cage type. Machines of the induction type, as is well known, can carry heavy overloads without injury. With the pole numbers selected as specified above the main turbine A may be run at a speed twice or three times as great as the speed of the propeller-shaft, while the turbine E may be run at a still higher speed. In this way maximum efficiency is obtained from the steam-turbines.

I do not desire to limit myself to the particular construction and arrangement of parts here shown, but aim in the appended claims to cover all modifications which are within the scope of my invention.

What I claim as new, and desire to secure by Letters Patent of the United States, is—

1. In combination, a driving member, a driven member, an induction-generator having one member connected to the driving member and the other to the driven member, an induction-motor supplied with current from said generator and mechanically connected to assist in driving the load, and a synchronous generator for fixing the frequency of the induction-machines.

2. In combination, a driving member, a driven member, an induction-generator having one member connected to the driving member and the other to the driven member, an induction-motor supplied with current from said generator and mechanically connected to assist in driving the load, a synchronous generator for fixing the frequency of the induction-machines, and means for varying the relative speeds of said induction-machines.

3. In combination, a driving member, a driven member, an induction-generator having one member connected to the driving member and the other to the driven member, an induction-motor supplied with current from said generator and mechanically connected to assist in driving the load, a synchronous generator for fixing the frequency of the induction-machines, and means for varying the number of poles of one of said induction-machines.

4. In combination, a prime mover, a shaft to be driven thereby, an induction-generator having one member mounted on the shaft of the prime mover and the other member on the driven shaft, an induction-motor supplied with current from said generator and having its rotor mounted on the driven shaft, a second prime mover, and a synchronous generator driven thereby and connected in circuit with said induction-machines.

5. In combination, a prime mover, a shaft to be driven thereby, an induction-generator having one member mounted on the shaft of the prime mover and the other member on the driven shaft, an induction-motor supplied with current from said generator and having its rotor mounted on the driven shaft, a second prime mover, a synchronous generator driven thereby and connected in circuit with said induction-machines, and means for varying the number of poles of one of said induction-machines.

6. In combination, a prime mover, a shaft to be driven thereby, an induction-generator having one member mounted on the shaft of the prime mover and the other member on the driven shaft, an induction-motor supplied with current from said generator and having its rotor mounted on the driven shaft, a second prime mover, a synchronous generator driven thereby and connected in circuit with said induction-machines, and means for opening the circuit of the induction-generator and reversing the induction-motor to reverse the direction of rotation of the driven shaft.

7. In combination, a prime mover, a shaft to be driven thereby, an induction-generator having one member mounted on the shaft of the prime mover and the other member on the driven shaft, an induction-motor supplied with current from said generator and having its rotor mounted on the driven shaft, a second prime mover, a synchronous generator driven thereby and connected in circuit with said induction-machines, and means for regulating the division of load between the two prime movers.

8. In combination, a steam-turbine, a shaft to be driven thereby, an induction-generator having one member mounted on the turbine-shaft and the other member on the driven shaft, an induction-motor supplied with current from said generator and mechanically connected to assist in driving the load, a second steam-turbine, a synchronous generator driven by the second turbine and connected in circuit with said induction-machines, and means for regulating the division of load between the two turbines.

9. In combination, a steam-turbine, a shaft to be driven thereby, an induction-generator having one member mounted on the turbine-shaft and the other member on the driven shaft, an induction-motor supplied with current from said generator and mechanically connected to assist in driving the load, a second steam-turbine, a synchronous generator driven by the second turbine and connected in circuit with said induction-machines, piping between the two turbines whereby one is driven by the exhaust-steam from the other, and means for regulating the division of load between the two turbines.

10. In combination, a steam-turbine, a shaft to be driven thereby, an induction-generator having one member mounted on the turbine-shaft and the other member on the driven shaft, an induction-motor supplied with current from said generator and mechanically connected to assist in driving the load, a second steam-turbine, a synchronous generator driven by the second turbine and connected in circuit with said induction-machines, piping between the two turbines whereby one is driven by the exhaust-steam from the other, and means for regulating the pressure of said exhaust-steam.

11. In a power-transmission mechanism, two induction-machines, one having both members rotatable and connected to the driving and driven members respectively and the other supplied with the current generated in the first machine by the difference in speed of driving and driven members, and means for fixing the frequency of the induction-machines.

12. In a power-transmission mechanism, two induction-machines, one having both members rotatable and connected to the driving and driven members respectively and the other supplied with the current generated in the first machine by the difference in speed of driving and driven members, means for fixing the frequency of the induction-machines, and means for varying the relative speeds of said induction-machines.

13. In a power-transmission mechanism, two induction-machines, one having both members rotatable and connected to the driving and driven members respectively and the other supplied with the current generated in the first machine by the difference in speed of driving and driven members, means for fixing the frequency of the induction-machines, and means for varying the number of poles of one of said induction-machines.

14. In combination, a steam-turbine, a shaft to be driven thereby, an induction-generator having one member connected on the turbine-shaft and the other member on the driven shaft, an induction-motor supplied with current from said generator and having its rotor mounted on the driven shaft, a second steam-turbine having a normally idle portion, a synchronous generator driven by the second turbine and connected in circuit with said induction-machines, piping between the two turbines whereby the first is driven by the exhaust-steam from the second, means for diverting said exhaust-steam to the normally idle portion of the second turbine, and means for opening the circuit of the induction-generator.

15. In combination, a steam-turbine, a shaft to be driven thereby, an induction-generator having one member mounted on the turbine-shaft and the other mounted member on the driven shaft, an induction-motor supplied with current from said generator and having its rotor mounted on the driven shaft, a second steam-turbine having a normally idle portion, a synchronous generator driven by the second turbine and connected in circuit with said induction-machines, piping between the two turbines whereby the first is driven by the exhaust from the second, means for diverting said exhaust-steam to the normally idle portion of the second turbine, means for opening the circuit of the induction-generator, and means for reversing the induction-motor to reverse the direction of rotation of the driven shaft.

In witness whereof I have hereunto set my hand this 3d day of April, 1906.

WILLIAM L. R. EMMET.

Witnesses:
BENJAMIN B. HULL,
HELEN ORFORD.